April 4, 1944.    W. SCHADE ET AL    2,346,086

PHOTOGRAPHIC OBJECTIVE

Filed June 1, 1942

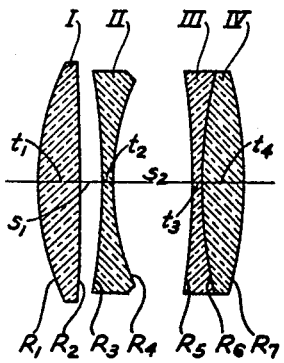

| EXAMPLE: 1 | f/4.5 | | f=100mm. | B.F.=89.7mm. |
|---|---|---|---|---|
| LENS | $N_D$ | V | RADII | THICKNESSES |
| I | 1.697 | 56.1 | $R_1 = +\ 27.1$ mm. | $t_1 = 4.05$ mm. |
| | | | $R_2 = -1000.0$ mm. | $s_1 = 2.2$ mm. |
| II | 1.605 | 43.6 | $R_3 = -\ 76.8$ mm. | $t_2 = 1.1$ mm. |
| | | | $R_4 = +\ 25.2$ mm. | $s_2 = 7.7$ mm. |
| III | 1.621 | 36.2 | $R_5 = -\ 81.8$ mm. | $t_3 = 1.0$ mm. |
| IV | 1.766 | 45.8 | $R_6 = +\ 48.7$ mm. | $t_4 = 3.9$ mm. |
| | | | $R_7 = -\ 42.1$ mm. | $T = 19.95$ mm. |

| EXAMPLE: 2 | f/4.5 | | f=100mm. | B.F.=89.7mm. |
|---|---|---|---|---|
| LENS | $N_D$ | V | RADII | THICKNESSES |
| I | 1.697 | 56.1 | $R_1 = +\ 26.4$ mm. | $t_1 = 3.9$ mm. |
| | | | $R_2 = \infty$ | $s_1 = 2.0$ mm. |
| II | 1.605 | 43.6 | $R_3 = -\ 85.6$ mm. | $t_2 = 1.1$ mm. |
| | | | $R_4 = +\ 24.7$ mm. | $s_2 = 7.5$ mm. |
| III | 1.621 | 36.2 | $R_5 = -\ 90.5$ mm. | $t_3 = 1.0$ mm. |
| IV | 1.744 | 45.8 | $R_6 = +\ 48.3$ mm. | $t_4 = 4.0$ mm. |
| | | | $R_7 = -\ 44.5$ mm. | $T = 19.5$ mm. |

WILLY SCHADE
KARL TOLLE
INVENTORS

BY
ATT'Y. & AG'T.

Patented Apr. 4, 1944

2,346,086

UNITED STATES PATENT OFFICE 2,346,086

PHOTOGRAPHIC OBJECTIVE

Willy Schade and Karl Tolle, Rochester, N. Y., assignors to Eastman Kodak Company, Rochester, N. Y., a corporation of New Jersey Application June 1, 1942, Serial No. 445,282

6 Claims. (Cl. 88—57)

This invention relates to photographic objectives and involves a change in a well known class of objectives represented by such patents as U. S. 721,240, Rudolph of 1903 and more recently by U. S. 2,158,178 to one of us (Schade) and Frederick.

It is an object of the present invention to provide a modification of such lenses so as to have a flat field out to 27° from the axis and practically free of coma over this field.

It is also an object of the invention to provide a lens highly corrected for color and especially for lateral color.

According to the invention, a photographic objective is provided consisting of a positive element with its more highly curved surface to the front, spaced in front of a biconcave element with its more highly curved surface to the rear and, spaced behind the biconcave element a doublet with a negative element cemented to the front of a biconvex element whose index of refraction is greater than 1.7, the main novel feature being that the cemented surface must have a radius of curvature greater than the rear surface of this biconvex element. Preferably the front element of the lens has an index of refraction between 1.65 and 1.8 (measured for the D line of the spectrum) and has a dispersive index between 45 and 65. Also in the preferred embodiment of the invention, the front surface of the rear doublet is concave to the front and has a radius of curvature between ½F and F where F is the focal length of the objective.

The accompanying drawing illustrates two forms of the preferred embodiment of the invention.

The specifications for these forms are also on the drawing and are as follows:

Example 1

| f/4.5 | | f=100 mm. | | B. F. =89.7 mm. |
|---|---|---|---|---|
| Lens | $N_D$ | V | Radii | Thicknesses |
| I | 1.697 | 56.1 | $R_1=+27.1$ mm. $R_2=-1000.0$ | $t_1=4.05$ mm. $S_1=2.2$ |
| II | 1.605 | 43.6 | $R_3=-76.8$ $R_4=+25.2$ | $t_2=1.1$ $S_2=7.7$ |
| III | 1.621 | 36.2 | $R_5=-81.8$ | $t_3=1.0$ |
| IV | 1.766 | 45.8 | $R_6=+48.7$ $R_7=-42.1$ | $t_4=3.9$ $T=19.95$ |

Example 2

| f/4.5 | | f=100 mm. | | B. F. =89.7 mm. |
|---|---|---|---|---|
| Lens | $N_D$ | V | Radii | Thicknesses |
| I | 1.697 | 56.1 | $R_1=+26.4$ mm. $R_2=\infty$ | $t_1=3.9$ mm. $S_1=2.0$ |
| II | 1.605 | 43.6 | $R_3=-85.6$ $R_4=+24.7$ | $t_2=1.1$ $S_2=7.5$ |
| III | 1.621 | 36.2 | $R_5=-90.5$ | $t_3=1.0$ |
| IV | 1.744 | 45.8 | $R_6=+48.3$ $R_7=-44.5$ | $t_4=4.0$ $T=19.5$ |

The only difference between these two forms of the lens is that Example 1 has an extremely flat field and practically negligible coma, whereas Example 2 has the coma almost completely eliminated with slightly greater curvature of field but still extremely flat.

Having thus described two preferred embodiments of our invention, we wish to point out that it is limited only by the accompanying claims.

What we claim is:

1. A highly corrected photographic objective consisting of three components of which the one on the long conjugate side is a positive element with its more highly curved surface to the front, the middle one is a biconcave element with its more highly curved surface to the rear and the rear one is a doublet with a biconcave element cemented to the front of a biconvex element whose index of refraction is greater than 1.7, the cemented surface having a radius of curvature greater than that of the rear surface of said biconvex element.

2. An objective according to claim 1 in which the first mentioned positive element has an index of refraction between 1.65 and 1.8 and a dispersive index between 45 and 65.

3. An objective according to claim 1 in which the front surface of the rear component has a radius of curvature between .5F and F where F is the focal length of the objective.

4. An objective according to claim 1 in which the first mentioned positive element has an index of refraction between 1.65 and 1.8 and a dispersive index between 45 and 65 and the front surface of the rear component has a radius of curvature between .5F and F where F is the focal length of the objective.

5. An highly corrected photographic objective consisting of three components of which the one on the long conjugate side is a positive element with its more highly curved surface to the front, the middle one is a biconcave element with its more highly concave surface toward the rear and the rear one is a doublet with a biconcave element cemented to the front of a biconvex element characterized by the cemented surface having a radius of curvature greater than that of the rear surface of said biconvex element and by the front surface of the rear component having a radius of curvature between 0.5F and F where F is the focal length of the objective.

6. A photographic objective having approximately the following specifications:

| Lens | $N_D$ | V | Radii | Thicknesses |
|---|---|---|---|---|
| I | 1.70 | 56 | $R_1=+.25F$<br>$R_2>-5F$ | $t_1=.04F$<br>$S_1=.02F$ |
| II | 1.60 | 44 | $R_3=-.8F$<br>$R_4=+.25F$ | $t_2=.01F$<br>$S_2=.08F$ |
| III | 1.62 | 36 | $R_5=-.9F$ | $t_3=.01F$ |
| IV | 1.74 | 46 | $R_6=+.5F$<br>$R_7=-.4F$ | $t_4=.04F$ | where the Roman numerals refer to elements starting with the long conjugate or front side, $N_D$ is the index of refraction with reference to the D line of the spectrum, V is the dispersive index, $R_1$ to $R_7$ are the radii of curvature of the refractive surfaces consecutively from front to rear, the + and − signs refer respectively to surfaces convex and concave to the front, the > sign means greater than, $t_1$ to $t_4$ are the axial thicknesses of the elements, $S_1$ and $S_2$ are the air space thicknesses, F is the focal length of the objective and the sixth surface is the only cemented one.

WILLY SCHADE.
KARL TOLLE.